United States Patent
Ramanujam et al.

(10) Patent No.: US 12,435,282 B2
(45) Date of Patent: Oct. 7, 2025

(54) PROCESSES AND APPARATUSES FOR HEATING A HYDROCARBON FEED STREAM FOR A REACTOR

(71) Applicant: UOP LLC, Des Plaines, IL (US)

(72) Inventors: Srinivasan Ramanujam, New Delhi (IN); Chintan Surendra Shah, New Delhi (IN); Pankaj Kumar Singh, New Delhi (IN)

(73) Assignee: UOP LLC, Des Plaines, IL (US)

( * ) Notice: Subject to any disclaimer, the term of this patent is extended or adjusted under 35 U.S.C. 154(b) by 250 days.

(21) Appl. No.: 18/447,434

(22) Filed: Aug. 10, 2023

(65) Prior Publication Data

US 2024/0059984 A1   Feb. 22, 2024

Related U.S. Application Data

(60) Provisional application No. 63/371,905, filed on Aug. 19, 2022.

(51) Int. Cl.
C10G 45/72   (2006.01)

(52) U.S. Cl.
CPC ....... *C10G 45/72* (2013.01); *C10G 2300/202* (2013.01); *C10G 2300/4006* (2013.01)

(58) Field of Classification Search
None
See application file for complete search history.

(56) References Cited

U.S. PATENT DOCUMENTS

| | | | |
|---|---|---|---|
| 9,745,523 B2 | 8/2017 | Ganguly et al. | |
| 2015/0073186 A1* | 3/2015 | Banerjee | C10G 49/26 422/111 |
| 2021/0363441 A1 | 11/2021 | Mukherjee et al. | |
| 2021/0403817 A1 | 12/2021 | Fathi et al. | |
| 2022/0204869 A1 | 6/2022 | Jørgensen | |
| 2022/0213393 A1 | 7/2022 | Fathi et al. | |

FOREIGN PATENT DOCUMENTS

WO   2009073440 A2   6/2009

OTHER PUBLICATIONS

International Search Report from corresponding PCT application No. PCT/US2023/030577, dated Dec. 8, 2023.
Written Opinion from corresponding PCT application No. PCT/US2023/030577, dated Dec. 8, 2023.

\* cited by examiner

*Primary Examiner* — In Suk C Bullock
*Assistant Examiner* — Alyssa L Cepluch

(57) ABSTRACT

Processes and apparatuses for heating a feed stream for a reactor which has a charge heater. At least one process stream provides heat so that a pre-heated feed stream passed to the charge heater is a vapor stream. The process stream may be the heated stream from the outlet of the charge heater. Alternatively, the process stream may be the effluent stream from the reactor that has been heated.

13 Claims, 2 Drawing Sheets

PROCESSES AND APPARATUSES FOR HEATING A HYDROCARBON FEED STREAM FOR A REACTOR

RELATED APPLICATIONS

Figure 1:
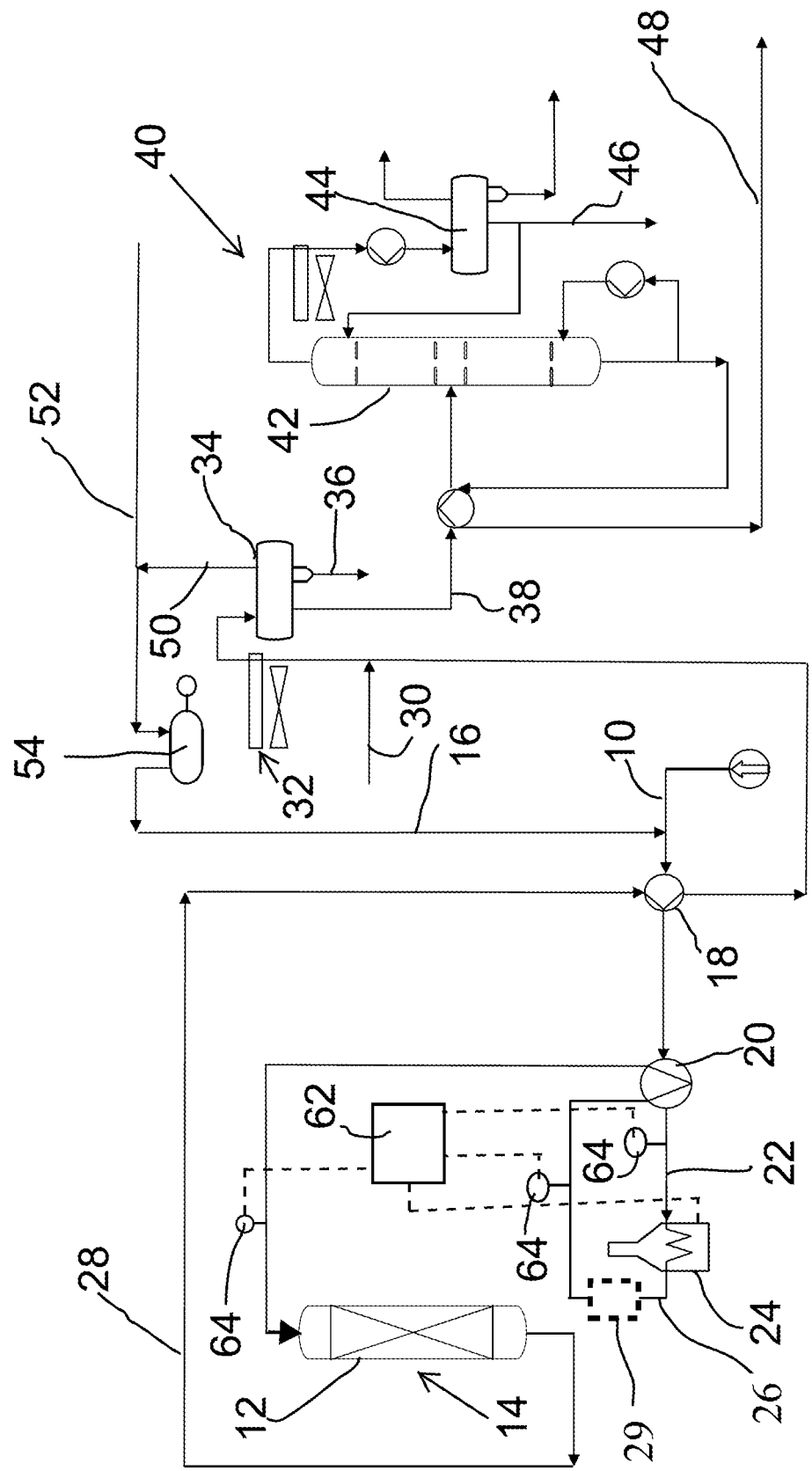

This application claims priority to U.S. Provisional Patent Application No. 63/371,905 filed on Aug. 19, 2022, the entirety of which is incorporated herein by reference.

FIELD OF THE INVENTION

This invention relates generally to processes and apparatuses for heating a hydrocarbon feed stream for a reactor, and more particularly to processes and apparatuses which heat the feed stream to achieve a vapor stream for a fired heater before passing the feed stream to the reactor.

BACKGROUND OF THE INVENTION

Hydrotreating is a catalytic chemical process widely used to remove sulfur, nitrogen and other heteroatoms from various hydrocarbons components during the refining process. The removal of sulfur compounds, or more specifically sulfur hydrocarbon compounds such as mercaptans, is important to reduce sulfur dioxide emissions as well as to avoid the poisoning of noble metal catalysts (e.g. platinum, rhenium, etc.) used in downstream catalytic reforming units that upgrade the octane rating of naphtha streams. For example, heavy naphtha product resulting from hydrocracking and/or hydrotreating process is low in octane must be catalytically "reformed" to improve the octane. Further, the presence of sulfur compounds will poison the catalysts used in a reforming unit.

However, recombinant sulfur compounds can be formed when the reactor effluent material contains hydrogen sulfide above a certain temperature. The result is the formation of mercaptans that affect the quality of certain products and which boil in the naphtha range. This necessitates the need for Sulfur Guard Bed(s) (SGBs) to meet the sulfur limit of downstream processing units.

Additionally, a hydrotreating reactor often requires a higher hydrogen to hydrocarbon ratio to meet a dew point margin at the start of run to the charge heater for the reactor. For full range and heavy naphtha hydrotreating reactors, the required to hydrogen to hydrocarbon ratio is sometimes at least 2 times of the stochiometric requirement.

Newer generation hydrotreating catalysts have the capability to run at temperatures lower than 316° C. (600° F.). However, the dew point issue forces the hydrotreating reactors to have an operating temperature of at least 316° C. (600° F.) or even 321° C. to 327° C. (610° F. to 620° F.) at the start of run but limiting the end of run reactor outlet temperature to 343° C. (650° F.). This lowers hydrotreating catalyst cycle length and at the same time, it results in sulfur recombination to form mercaptans.

Accordingly, it would be desirable to have more effective and efficient processes to heat a feed stream to achieve the dew point margin and address one or more of these problems.

SUMMARY OF THE INVENTION

The present invention provides processes and apparatus for heating a feed stream for a reactor by mitigating the dew point margin issue to a charge heater with a lower hydrogen to hydrocarbon ratio. This invention also allows the hydrotreating reactor to operate at a range of 304° C. to 332° C. (580° F. to 630° F.) for start of run to end of run to limit the sulfur recombination reaction at higher reactor operating temperatures without the dew point issue in a charge heater. This helps to eliminate the need for SGBs to treat the hydrotreated naphtha stream for downstream processing units.

The present invention preheats the feed to the charge heater inlet with, for example, the charge heater outlet stream. This increases the charge heater inlet temperature and achieves the required dew point margin. At the same time, this also allows the reactor to have a reactor inlet temperature of less than 316° C. (600° F.) at the start of run. This permits the reactors to operate at a lower range, typically 304° C. to 332° C. (580° F. to 630° F.), so the sulfur recombination is reduced or eliminated and thus the SGB(s) are not required for most of the units. It is also contemplated that the effluent stream from the reactor may be heated and used to provide heat to the feed stream to achieve the dew point margin.

Therefore, the present invention may be characterized, in at least one aspect, as providing a process for heating a hydrocarbon feed stream for a reactor by: heating a hydrocarbon process stream associated with a reactor to provide a heated hydrocarbon process stream; transferring heat to a hydrocarbon feed stream for the reactor from the heated hydrocarbon process stream to provide a pre-heated hydrocarbon feed stream, wherein the pre-heated hydrocarbon feed stream is a vapor stream; heating the pre-heated hydrocarbon feed stream in a charge heater to form a heated hydrocarbon feed stream; passing the heated hydrocarbon feed stream to the reactor; and, recovering a hydrocarbon effluent stream from the reactor.

In one or more aspects, the present invention may generally be characterized as providing a process for heating a hydrocarbon feed stream for a reactor by: heating a hydrocarbon feed stream for a reactor in a heat exchanger to provide a pre-heated hydrocarbon feed stream, wherein the pre-heated hydrocarbon feed stream from the heat exchanger is a vapor stream; heating the pre-heated hydrocarbon feed stream in a charge heater to form a heated hydrocarbon feed stream; passing the heated hydrocarbon feed stream from the charge heater to the heat exchanger to heat the hydrocarbon feed stream and provide the pre-heated hydrocarbon feed stream; and, after the heated hydrocarbon feed stream has been passed to the heat exchanger, passing the heated hydrocarbon feed stream to the reactor.

The present invention may also be broadly characterized as providing, in one or more aspects, a process for heating a hydrocarbon feed stream for a reactor by: heating a hydrocarbon feed stream for a reactor in a heat exchanger to provide a pre-heated hydrocarbon feed stream, wherein the pre-heated hydrocarbon feed stream is a vapor stream; heating the pre-heated hydrocarbon feed stream in a charge heater to form a heated hydrocarbon feed stream; passing the heated hydrocarbon feed stream to the reactor; recovering a hydrocarbon effluent stream from the reactor; heating the hydrocarbon effluent stream in a heating zone to provide a heated hydrocarbon effluent stream; and, passing the heated hydrocarbon effluent stream to the heat exchanger to heat the hydrocarbon feed stream and provide the pre-heated hydrocarbon feed stream.

Additional aspects, embodiments, and details of the invention, all of which may be combinable in any manner, are set forth in the following detailed description of the invention.

DETAILED DESCRIPTION OF THE DRAWINGS

Figure 2:
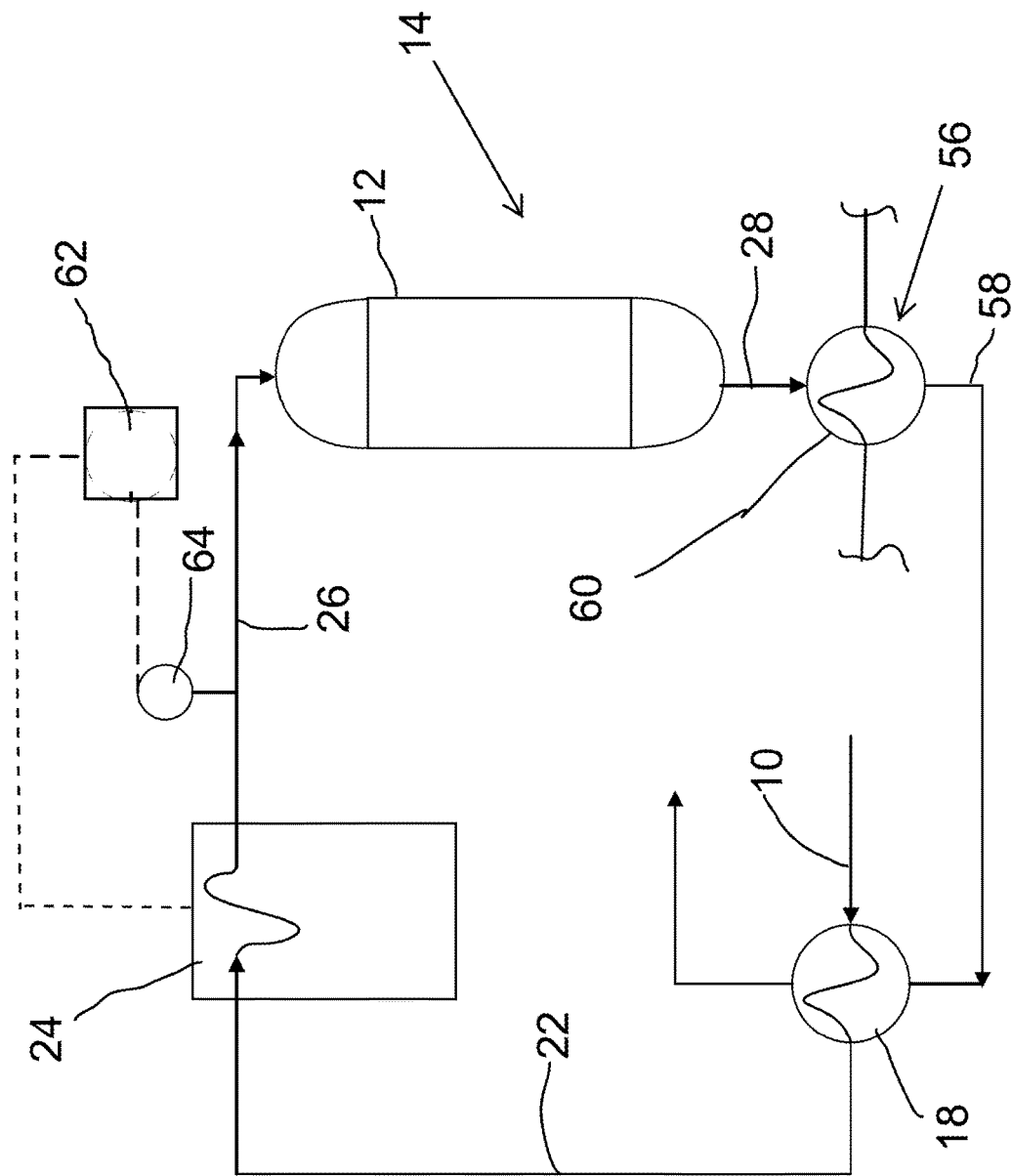

One or more exemplary embodiments of the present invention will be described below in conjunction with the following drawing figures, in which:

FIG. 1 is a process flow diagram of one or more embodiments of the present invention; and, FIG. 2 is another process flow diagram of one or more embodiments of the present invention.

DETAILED DESCRIPTION OF THE INVENTION

As mentioned above, the present invention is directed at heating a hydrocarbon feed stream for a reactor. Generally, in the present invention, a hydrocarbon process stream associated with the reactor, such as the feed stream or the reactor effluent stream is heated to provide a heated hydrocarbon process stream. Heat is transferred to a hydrocarbon feed stream for the reactor from the heated hydrocarbon process stream to provide a pre-heated hydrocarbon feed stream. The heat is added so that the pre-heated hydrocarbon feed stream is a vapor stream. The pre-heated hydrocarbon feed stream may then be heated in a charge heater to form a heated hydrocarbon feed stream. The heated hydrocarbon feed stream may be passed to the reactor where the hydrocarbons will undergo some reaction and a hydrocarbon effluent stream from the reactor may be recovered.

These processes allow for the reactor temperature to be lowered while still avoiding dew point issues in the charge heater for the reactor. With respect to hydrotreating reactor, this reduces the sulfur recombination within the reactor and thus reduces or eliminates the need for downstream sulfur management. The lower operating temperature will also increase the catalyst operating cycle, and hence improve the cycle length of the catalyst.

Additionally, the present processes utilize up to 50% lower hydrocarbon to hydrogen ratio for meeting the dew point margin for heavy/full range naphtha. This allows for smaller compressors to be utilized with a recycle hydrogen stream.

With these general principles in mind, one or more embodiments of the present invention will be described with the understanding that the following description is not intended to be limiting.

An exemplary embodiment of the present invention for heating a hydrocarbon feed stream 10 for a reactor 12 in a reaction zone 14 is shown in FIG. 1. In a preferred embodiment, the reactor 12 is a naphtha hydrotreating reactor, and preferably a vapor phase hydrotreating reactor. Accordingly, the following description will proceed with the understanding that such features and descriptions of the depicted embodiments are not intended to be limiting.

The source of hydrocarbon feed stream 10 is typically a straight run naphtha, condensate based naphtha, any hydrocracked naphtha, coker naphtha, visbreaker naphtha.

The hydrocarbon feed stream 10 is combined with a recycle vapor stream 16 that contains hydrogen and then passed to combined feed heat exchanger 18. From the combined feed heat exchanger 18, the hydrocarbon feed stream 10 is passed to a second heat exchanger 20. In the second heat exchanger 20, the hydrocarbon feed stream 10 is heated to provide a pre-heated hydrocarbon feed stream 22. The pre-heated hydrocarbon feed stream 22 is a vapor stream.

However, despite being a vapor stream, the temperature of the pre-heated hydrocarbon feed stream 22 will still be too low, accordingly, the pre-heated hydrocarbon feed 22 is passed to a charge, or fired, heater 24. In the charge heater 24, the pre-heated hydrocarbon feed 22 is heated further to provide a heated hydrocarbon feed stream 26. The heated hydrocarbon feed stream 26 may be passed from the charge heater 24 to the heat exchanger 20 to heat the hydrocarbon feed stream 10 and provide the pre-heated hydrocarbon feed stream 22.

temperature of the pre-heated hydrocarbon feed stream 22 is above its dew point. This temperature will vary based on the dew point requirement of the pre-heated hydrocarbon feed stream 22 from the heat exchanger 20. Such a temperature is typically in a range of 274° C. to 302° C. (525° F. to 575° F.). The temperature of the heated hydrocarbon feed stream 26 from the charge heater will typically be in the range of 302° C. to 360° C. (575° F. to 680° F.).

After the heated hydrocarbon feed stream 26 has been passed to the heat exchanger 20, it may then be passed to the reactor 12 which is operated under conditions to remove, in the presence of a hydrotreating catalyst, heteroatoms and provide a hydrotreated effluent 28. Suitable hydrotreating catalysts of cobalt molybdenum and/or nickel molybdenum are known in the art.

Using the heated hydrocarbon feed stream 26 to provide the heat to the hydrocarbon feed stream 10/preheated hydrocarbon stream 22 allows the temperature of the reactor 12 to be lower than is conventionally used. Typical operating conditions of the reactor ranges from approximately 2,068 to 5,516 kPa (300 to 800 psig) and 316° C. to 343° C. (600° F. to 650° F.). At the start of the reactor run, the operating temperature may be approximately 304° C. (580° F.). For an efficient metals and trace metals removal from the hydrocarbon feed stream 26, a minimum reactor operating temperature of 316° C. (600° F.) may be required. Hence a dedicated metals removal bed 29 may be utilized. In such case, the reactor 12 may not require such a metals removal bed.

The maximum operating temperature of the reactor 12 is below the sulfur recombination reaction temperature to eliminate or reduce the effect of sulfur recombination in the reactor 12. As discussed above, this allows the hydrotreated effluent 28 to meet sulfur specification requirements for downstream processing units without requiring a secondary sulfur management/removal system.

The hydrotreated effluent 28 is passed to the combined feed heat exchanger 18 to provide heat for the hydrocarbon feed stream 10. From the combined feed heat exchanger 18, a water wash 30 may be combined with the hydrotreated effluent 28 and the combined stream may be passed to a condenser 32 and then to a separation vessel 34.

In the separation vessel 34, a first liquid phase may be an aqueous phase that comprises sour water 36. A second liquid phase is a hydrocarbon phase 38 that may be sent to product recovery zone 40 that typically includes a stripper column 42 and another separation vessel 44 to separate the hydrocarbon phase 38 into various streams including an LPG stream 46 and a heavy naphtha stream 48 that may be passed to a platformer (not shown). The product recovery zone 40 is known in the art.

A vapor stream 50 from the separation vessel 34 comprises hydrogen that may be combined with additional hydrogen 52, compressed in a compressor 54, and then combined with the feed stream 10 as the recycle vapor stream 16. As discussed above, one of the benefits of the present invention is that the amount of recycle vapor stream 16 combined with the feed stream 10 may be reduced. This allows for a smaller compressor 54 to be used. It is contemplated that a ratio (in std ft³/BPSD) of recycle vapor stream 16 to hydrocarbon feed stream 10 is less than 2:1 and preferably 1:1.

Turning to the embodiment of FIG. 2, in which the same reference numerals are used for the same features discussed above, in the present invention, it is also contemplated that the hydrotreated effluent stream 28 may be used as the process stream to heat the hydrocarbon feed stream 10 for a reactor 12 in the combined feed heat exchanger 18 to provide the pre-heated hydrocarbon feed stream.

Accordingly, the hydrotreated effluent stream 28 is heated in a heating zone 56 to provide a heated hydrocarbon effluent stream 58. The heating zone 56 may include a heat exchanger 60 that receives steam or any hydrocarbon hot stream (either vapor or liquid) having a sufficient temperature. It is also contemplated that the heating zone 56 may include an electric heater or one or more electric heating coils. It is believed that an electric heater operating with electricity can in turn reduce the size or even replace the charge (fired) heater 24. Additionally, an electric heater provides the opportunity to use green electricity which may be used for a reduction of greenhouse emissions and reduce carbon footprint to achieve carbon neutrality.

The heated hydrocarbon effluent stream 58 is passed to the combined feed heat exchanger 18 which heats the hydrocarbon feed stream 10 and provides the pre-heated hydrocarbon feed stream 22. From the combined feed heat exchanger 18, the heated hydrocarbon effluent stream 58 may be processed in the same manner as discussed above regarding the effluent stream 28.

The pre-heated hydrocarbon feed stream 22, which again is a vapor stream, is passed to the charge heater 24 which provides the heated hydrocarbon feed stream 26. The heated hydrocarbon feed stream 26 may be passed from the charge heater 24 to the reactor 12.

Signals, measurements, and/or data generated or recorded by monitoring components may be transmitted to one or more controllers 62. The controller 62 may include at least one processor and memory storing computer-readable instructions that, when executed by the at least one processor, cause the one or more controllers 62 to perform a process that may include one or more steps. For example, the one or more controllers 62 may be configured to receive, from one or more monitoring components, sensors, probes, or the like, data related to at least one piece of equipment associated with the process or one process stream associated with the process. The one or more controllers 62 may be configured to analyze the data. Based on analyzing the data, the one or more controllers 62 may be configured to determine one or more recommended adjustments to one or more parameters of one or more processes described herein. The one or more controllers 62 may be configured to transmit encrypted or unencrypted data that includes the one or more recommended adjustments to the one or more parameters of the one or more processes described herein.

For example, in order to control a temperature of the various hydrocarbon streams 22, 26, temperature sensors 64 may be used to measure or otherwise obtain the temperatures of the various streams 22, 26. The obtained temperatures may be sent to the controller 62. The controller 62 may compare the obtain temperatures against target or desired temperatures or temperature ranges. If the obtained temperature is outside of the desire range or above or below a target temperature, the controller 62 may send signals to adjust one or more processing conditions to adjust the amount of heat produced by the fired heater 24. For example, the controller 62 may send a signal to a valve or other piece of equipment to change an amount of fuel gas to charger heater 24, to change a residence time in the charge heater 24, volumetric flow rates, an amount of combustion air passed to the charge heater 24, or the like. The adjusted process condition results in a change of operating parameters for the charge heater 24 so that the charge heater 24 operates at a different temperature in order to provide the heated hydrocarbon feed stream 26 with a temperature within the desired range or closer to the target temperature.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices parameter data system components described herein may be configured to communicate using any of these network protocols or technologies.

EXPERIMENTS

In a computer simulation of a hydrotreating reactor according to the first embodiment, showed that the dew point margin may be achieved with an increased temperature to the charge heater. Additionally, the ratio of hydrocarbon to hydrogen was reduced by half. Similar results were predicted for a simulation according to the second embodiment.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Specific Embodiments

While the following is described in conjunction with specific embodiments, it will be understood that this description is intended to illustrate and not limit the scope of the preceding description and the appended claims.

A first embodiment of the invention is a process for heating a hydrocarbon feed stream for a reactor, the process comprising heating a hydrocarbon process stream associated with a reactor to provide a heated hydrocarbon process stream; transferring heat to a hydrocarbon feed stream for the reactor from the heated hydrocarbon process stream to provide a pre-heated hydrocarbon feed stream, wherein the pre-heated hydrocarbon feed stream is a vapor stream; heating the pre-heated hydrocarbon feed stream in a charge heater to form a heated hydrocarbon feed stream; passing the heated hydrocarbon feed stream to the reactor; and, recovering a hydrocarbon effluent stream from the reactor. An embodiment of the invention is one, any or all of prior embodiments in this paragraph up through the first embodiment in this paragraph, wherein the hydrocarbon process stream comprises the hydrocarbon effluent stream from the reactor. An embodiment of the invention is one, any or all of prior embodiments in this paragraph up through the first embodiment in this paragraph, wherein the hydrocarbon process stream comprises the hydrocarbon feed stream.

A second embodiment of the invention is a process for heating a hydrocarbon feed stream for a reactor, the process comprising heating a hydrocarbon feed stream for a reactor in a heat exchanger to provide a pre-heated hydrocarbon feed stream, wherein the pre-heated hydrocarbon feed stream from the heat exchanger is a vapor stream; heating the pre-heated hydrocarbon feed stream in a charge heater to form a heated hydrocarbon feed stream; passing the heated hydrocarbon feed stream from the charge heater to the heat exchanger to heat the hydrocarbon feed stream and provide the pre-heated hydrocarbon feed stream; and, after the heated hydrocarbon feed stream has been passed to the heat exchanger, passing the heated hydrocarbon feed stream to the reactor. An embodiment of the invention is one, any or all of prior embodiments in this paragraph up through the second embodiment in this paragraph, wherein the reactor comprises a vapor phase hydrotreating reactor. An embodiment of the invention is one, any or all of prior embodiments in this paragraph up through the second embodiment in this paragraph, the hydrocarbon feed stream is combined with a recycle vapor stream. An embodiment of the invention is one, any or all of prior embodiments in this paragraph up through the second embodiment in this paragraph, wherein a ratio of feed stream to recycle vapor stream is approximately 1:1. An embodiment of the invention is one, any or all of prior embodiments in this paragraph up through the second embodiment in this paragraph, further comprising measuring a temperature of the pre-heated hydrocarbon feed stream, the heated hydrocarbon feed stream, or both, and, adjusting a process parameter associated with the fired heater to increase or decrease an amount of heat produced by the charge heater based on a measured temperature. An embodiment of the invention is one, any or all of prior embodiments in this paragraph up through the second embodiment in this paragraph, further comprising measuring the temperature of the heated hydrocarbon feed stream. An embodiment of the invention is one, any or all of prior embodiments in this paragraph up through the second embodiment in this paragraph, wherein the temperature of the heated hydrocarbon feed stream is measured between the charge heater and the heat exchanger. An embodiment of the invention is one, any or all of prior embodiments in this paragraph up through the second embodiment in this paragraph, wherein the temperature of the heated hydrocarbon feed stream is measured between the heat exchanger and the reactor. An embodiment of the invention is one, any or all of prior embodiments in this paragraph up through the second embodiment in this paragraph, wherein the temperature of the heated hydrocarbon feed stream is also measured between the charge heater and the heat exchanger. An embodiment of the invention is one, any or all of prior embodiments in this paragraph up through the second embodiment in this paragraph, wherein a temperature of the heated feed stream is between 302° C. to 360° C. (575° F. to 680° F.). An embodiment of the invention is one, any or all of prior embodiments in this paragraph up through the second embodiment in this paragraph, wherein a temperature of the pre-heated feed stream is above a dew point of the pre-heated feed stream. An embodiment of the invention is one, any or all of prior embodiments in this paragraph up through the second embodiment in this paragraph, wherein a temperature of the heated feed stream is between 302° C. to 360° C. (575° F. to 680° F.). An embodiment of the invention is one, any or all of prior embodiments in this paragraph up through the second embodiment in this paragraph, wherein a maximum operating temperature of the reactor is below a sulfur recombination reaction temperature. An embodiment of the invention is one, any or all of prior embodiments in this paragraph up through the second embodiment in this paragraph, further comprising passing the heated hydrocarbon stream to a metals removal bed before the heated hydrocarbon stream is passed to the heat exchanger.

A third embodiment of the invention is a process for heating a hydrocarbon feed stream for a reactor, the process comprising heating a hydrocarbon feed stream for a reactor in a heat exchanger to provide a pre-heated hydrocarbon feed stream, wherein the pre-heated hydrocarbon feed stream is a vapor stream; heating the pre-heated hydrocarbon feed stream in a charge heater to form a heated hydrocarbon feed stream; passing the heated hydrocarbon feed stream to the reactor; recovering a hydrocarbon effluent stream from the reactor; heating the hydrocarbon effluent stream in a heating zone to provide a heated hydrocarbon effluent stream; and, passing the heated hydrocarbon effluent stream to the heat exchanger to heat the hydrocarbon feed stream and provide the pre-heated hydrocarbon feed stream. An embodiment of the invention is one, any or all of prior embodiments in this paragraph up through the third embodiment in this paragraph, wherein the reactor comprises a vapor phase hydrotreating reactor. An embodiment of the invention is one, any or all of prior embodiments in this paragraph up through the third embodiment in this paragraph, the hydrocarbon feed stream is combined with a recycle vapor stream. An embodiment of the invention is one, any or all of prior embodiments in this paragraph up through the third embodiment in this paragraph, wherein the heating zone comprises an electric heater or one or more electric heating coils. An embodiment of the invention is one, any or all of prior embodiments in this paragraph up through the third embodiment in this paragraph, wherein the heating zone comprises a steam heat exchanger or a process exchanger configured to receive a hydrocarbon hot stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for heating a hydrocarbon feed stream for a reactor, the process comprising:
   heating a hydrocarbon feed stream for a reactor in a heat exchanger to provide a pre-heated hydrocarbon feed stream, wherein the pre-heated hydrocarbon feed stream from the heat exchanger is a vapor stream;
   heating the pre-heated hydrocarbon feed stream in a charge heater to form a heated hydrocarbon feed stream;
   passing the heated hydrocarbon feed stream from the charge heater to the heat exchanger to heat the hydrocarbon feed stream and provide the pre-heated hydrocarbon feed stream and a heat depleted hydrocarbon feed stream; and,
   passing the heat depleted hydrocarbon feed stream to the reactor,
   wherein the reactor comprises a vapor phase hydrotreating reactor.

2. The process of claim 1, wherein the hydrocarbon feed stream is combined with a recycle vapor stream.

3. The process of claim 2, wherein a ratio of feed stream to recycle vapor stream is approximately 1:1.

4. The process of claim 1, further comprising:
   measuring a temperature of the pre-heated hydrocarbon feed stream, the heated hydrocarbon feed stream, or both, and,
   adjusting a process parameter associated with the fired heater to increase or decrease an amount of heat produced by the charge heater based on a measured temperature.

5. The process of claim 4, further comprising:
   measuring the temperature of the heated hydrocarbon feed stream.

6. The process of claim 5, wherein the temperature of the heated hydrocarbon feed stream is measured between the charge heater and the heat exchanger.

7. The process of claim 5, wherein the temperature of the heat depleted hydrocarbon feed stream is measured between the heat exchanger and the reactor.

8. The process of claim 7, wherein the temperature of the heated hydrocarbon feed stream is also measured between the charge heater and the heat exchanger.

9. The process of claim 1, wherein a temperature of the heated feed stream is between 302° C. to 360° C. (575° F. to 680° F.).

10. The process of claim 9, wherein a temperature of the pre-heated feed stream is above a dew point of the pre-heated feed stream.

11. The process of claim 10, wherein a temperature of the pre-heated feed stream is between 274° C. to 302° C. (525° F. to 575° F.) 302° C. to 360° C. (575° F. to 680° F.).

12. The process of claim 11, wherein a maximum operating temperature of the reactor is below a sulfur recombination reaction temperature.

13. The process of claim 1, further comprising:
    passing the heated hydrocarbon stream to a metals removal bed before the heated hydrocarbon stream is passed to the heat exchanger.

* * * * *